US 7,092,950 B2

(12) United States Patent
Wong et al.

(10) Patent No.: US 7,092,950 B2
(45) Date of Patent: Aug. 15, 2006

(54) METHOD FOR GENERIC OBJECT ORIENTED DESCRIPTION OF STRUCTURED DATA (GDL)

(75) Inventors: Peter W. Wong, Woodinville, WA (US); Amanda Gian-Tien Nguyen, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 09/896,499

(22) Filed: Jun. 29, 2001

(65) Prior Publication Data

US 2003/0055806 A1 Mar. 20, 2003

(51) Int. Cl.
G06F 7/00 (2006.01)
G06F 17/00 (2006.01)
G06F 17/30 (2006.01)
G06F 15/117 (2006.01)

(52) U.S. Cl. ............................ 707/100; 707/1; 709/220
(58) Field of Classification Search ................... 707/1, 707/103, 100, 102, 103 R; 709/220, 103 R
See application file for complete search history.

(56) References Cited

U.S. PATENT DOCUMENTS

| | | | | |
|---|---|---|---|---|
| 5,877,966 A * | 3/1999 | Morris et al. ................... | 716/4 |
| 5,887,193 A * | 3/1999 | Takahashi et al. ............. | 710/8 |
| 5,970,490 A * | 10/1999 | Morgenstern ................. | 707/10 |
| 6,081,774 A * | 6/2000 | de Hita et al. ................... | 704/9 |
| 6,105,062 A * | 8/2000 | Andrews et al. ............ | 709/223 |
| 6,141,792 A * | 10/2000 | Acker et al. ................. | 717/116 |
| 6,151,608 A * | 11/2000 | Abrams ....................... | 707/204 |
| 6,182,136 B1 * | 1/2001 | Ramanathan et al. ....... | 709/224 |
| 6,199,195 B1 * | 3/2001 | Goodwin et al. ........... | 717/104 |
| 6,208,986 B1 * | 3/2001 | Schneck et al. ............... | 707/3 |
| 6,449,715 B1 * | 9/2002 | Krivoshein .................... | 713/1 |
| 6,496,832 B1 * | 12/2002 | Chi et al. ................... | 707/102 |
| 6,507,856 B1 * | 1/2003 | Chen et al. ................. | 715/513 |
| 6,601,057 B1 * | 7/2003 | Underwood et al. ........... | 707/1 |
| 6,678,414 B1 * | 1/2004 | Loce et al. ................. | 382/209 |
| 6,732,331 B1 * | 5/2004 | Alexander .................. | 715/513 |
| 6,910,068 B1 * | 6/2005 | Zintel et al. ................ | 709/220 |
| 2002/0032684 A1 * | 3/2002 | Kobayashi et al. ......... | 707/100 |
| 2002/0035621 A1 * | 3/2002 | Zintel et al. ................ | 709/220 |

(Continued)

OTHER PUBLICATIONS

Tomas Isakowitz, Shimon Schocken and Henry C. Lucas, Jr. "Toward a logical/Physical Theory of Spreadsheet modeling", Jan. 1995, p. 1-37.*

*Primary Examiner*—Frantz Coby
*Assistant Examiner*—Cindy Nguyen
(74) *Attorney, Agent, or Firm*—Shook, Hardy & Bacon, L.L.P.

(57) ABSTRACT

A method is provided for use in a computer system to describe and obtain arbitrary data relating to a subject. The method provides a meta-language "Generic Object Oriented Description of Structured Data (GDL)" and a Parser. GDL allows a user to organize, define and describe subjects through the use of a schema known as a Template. Templates can be used to define the semantics for each subject element as well as, to define how each element fits into a larger data framework. Through the concept of Inheritance, Templates can be extended and defined to various levels of nesting, while still having a common core of properties. GDL allows the features and attributes of a subject to be quickly and readily extended or modified by altering a source file. A GDL parser provides a structured and hierarchical representation of the information, validation of text-entry semantics and a means to traverse through information obtained from the source file.

19 Claims, 4 Drawing Sheets

U.S. PATENT DOCUMENTS

2002/0059425 A1* 5/2002 Belfiore et al. ............. 709/226
2002/0112058 A1* 8/2002 Weisman et al. ........... 709/227
2004/0015822 A1* 1/2004 Linton et al. ................ 717/104
2004/0015832 A1* 1/2004 Stapp et al. ................ 717/106

* cited by examiner

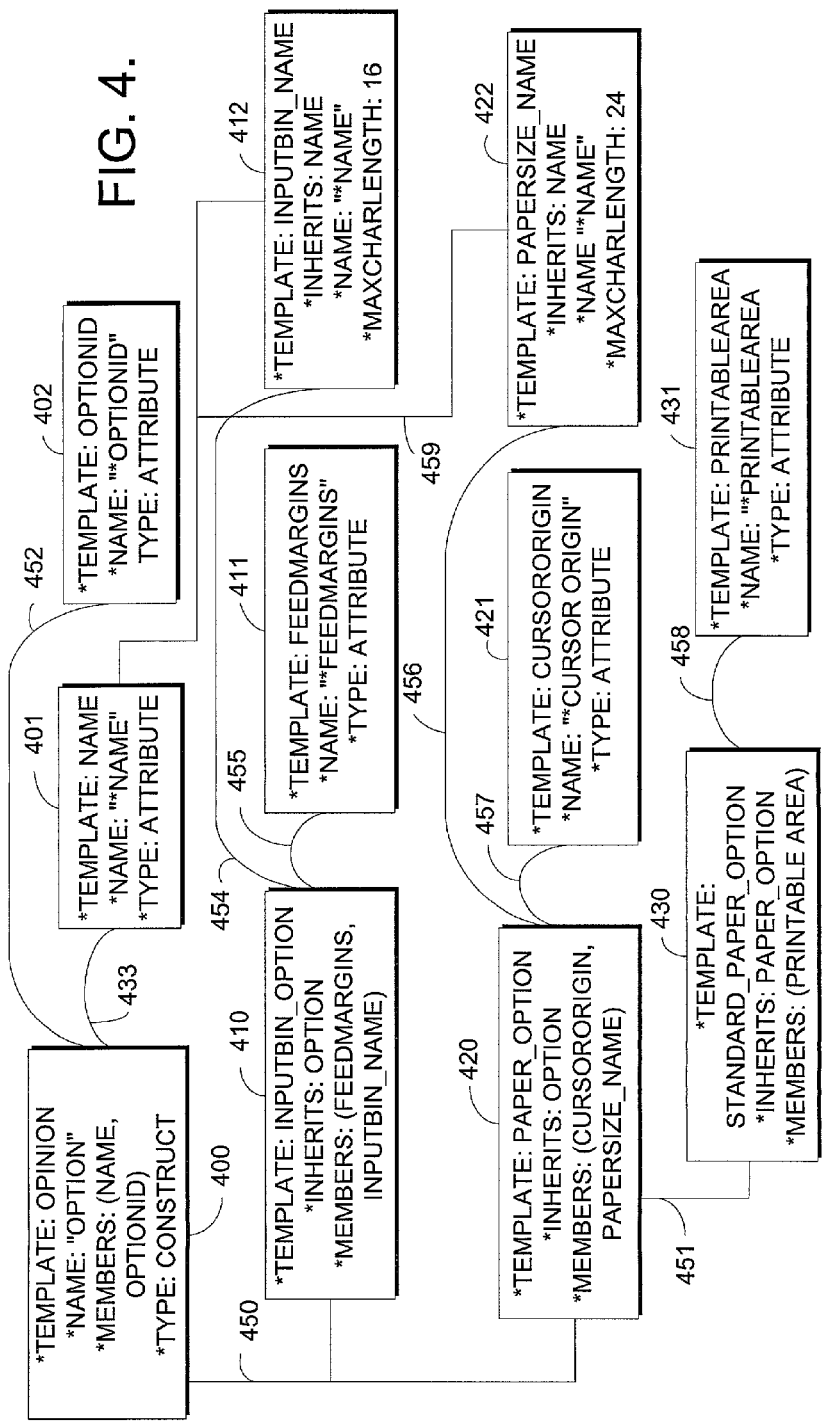

METHOD FOR GENERIC OBJECT ORIENTED DESCRIPTION OF STRUCTURED DATA (GDL)

TECHNICAL FIELD

The present invention relates generally to computer software and more particularly to a method and system for organizing, defining and obtaining information related to arbitrary data in a computer system.

BACKGROUND OF THE INVENTION

Computer operating systems commonly incorporate a feature to communicate system and application information to and from a variety of devices from multiple manufacturers. The growth of the computer industry has engendered a large number of companies who provide both hardware and software peripheral products for the market. In all of these cases, the operating system manufacturer has to ensure the compatibility and the exchange of data within and between the computers on which such hardware and software are installed. To ensure that the multitude of application programs that are executed on a computer system are able to effectively communicate with peripheral devices, the operating system designers have developed interfaces that allow device-independent access. Two such interfaces are a graphics device interface (GDI) and a Generic Printer Definition Language (GPD), both of which were developed specifically to deal with printer devices.

The GDI affects the output data from the application programs by invoking functions which allow access to printing devices in a device-independent manner. GDI provides a uniform interface to the application programs and the output peripheral devices to which the programs send data. Not withstanding this uniform interface, GDI is unable to produce actual printer control commands which are capable of driving each of the multiple models of printer devices available on the market. As such, each individual printer required its own individual printer driver that could implement the various control functions of the respective printers, based upon the standardized output from the GDI. These standard functions included initialization, information, output, attribute, mode and escape sequences. While each of these monolithic drivers provided the necessary interface for each printer, they were typically very large in size. The need for such extensive drivers impacted not only the printer manufacturer and the operating system vendor, but also the individual computer system into which such drivers would be installed. Specifically, the space requirement and resource utilization on a system become unwieldy especially when more than one printer needs to be supported. In addition, the development and coding of these drivers is cumbersome at best. To overcome the problems related to GDI, a Graphical User Interface (GUI) tool was developed to aid in writing these drivers. This tool included a Generic Printer Characterization (GPC) which was intended to provide an application independent of describing the total functionality and capabilities of one or more printers supplied by a printer Original Equipment Manufacturer (OEM). GPC has limited capability to describe printer devices and limited extensibility for printer features. This led to the development of a flexible modular architecture of syntax and semantics to be used in printer definitions known as GPD. This definitional language provides better support for more varieties of printers, and improves the output quality, ease of use and performance without the necessity for redesign.

GPD is a text-based printer description file format for creating mini-drivers that run with a single universal driver. Typically there is one GPD file for each printer model with the ability for different printers to also share a GPD file. A GPD file describes all the features on a printer including how to display and invoke these features. A GPD file also contains printer-specific commands and attributes that enable the Universal Driver to generate the correct printer-ready output data.

Although GPD provides support for generic features, custom help, installable options and various types of constraints, it is limited in the fact that it is only directed to printer devices. The support provided in GPD for value dependency allows developers to describe any kind of dependency between printer commands and or attributes. This support, combined with the command parameter specification scheme while useful, are also some of the constraints on wide scale applicability of the language. The Parser for GPD parses data into a single binary format, as such, the Universal Driver need not worry about different binary formats as was the case with GPC revisions and monolithic drivers. The GPD Parser none the less has other drawbacks. For instance, the static (non-extensible) set of Attribute:Value pairs and predefined collections of these pairs (Constructs) that can be used to describe the characteristics of printer devices, require that as new features are added to the printer, new Attribute: Value pairs or Constructs need to be defined and added to the GPD language thereby necessitating changes to the GPD Parser at a programmatic level.

The task of describing the semantics of GPD constructs is complicated by the fact the semantic content is dependent on the context in which the construct occurs. For example an *Options construct that appears within a PaperSize *Feature has different members than an *Options construct that appears within a Resolution *Feature. Indeed, an *Option describing Custom papers is different from an *Option describing system-defined papers and even an *Option describing Letter size paper is different from an *Option describing Legal size paper. This makes a description using a typical Extensible Markup Language (XML) schema impossible. Although XML is a meta-markup language that provides a format for describing structured data by encoding content, semantics and schemata for a wide variety of cases, XML lacks the ability and functionality that allows descriptions to inherit the properties and characteristics of a base description. A description using a template containing many nested Switch/Case dependencies is awkward at best. A way to define relationships between templates using the object oriented concept of Inheritance would yield a simpler and more robust language feature. While this concept is available in object oriented programming languages such as C++, the application of inheritance in these languages is directed and applicable to source code and memory space. In fact, the purpose and use of inheritance in these environments is as a means to polymorphism (the ability to view two or more similar objects through common interface, thus eliminating the need to differentiate between the objects), and reusability of code.

While the concept of easily describing and categorizing groups of data as defined by XML has multiple advantages, it lacks the robustness, ability and structure provided by the notion of inheritance. Multiple individuals cannot easily enhance or grow an XML descriptive or definitional grouping without modifying the underlying grouping, thus creating compatibility problems with any applications or programs that utilized the original data grouping. Similarly, the ability to utilize inheritance within Object Oriented Programs (OOP) such as C++ lacks the ease of use provided by XML. Individuals are forced to defined subjects as combinations of code and memory segments in OOP, which obfuscates the desired simplicity in defining or describing subjects.

Accordingly, there exists a need to avoid the overhead needed to continuously update descriptive languages and Parsers while also providing flexibility in the description or definition of subject data. A meta-language which permits third parties to add any Attribute:Value pairs or Constructs that they desire and to describe the new Attributes using Templates without the requirement of modifying the language or the Parser is needed. The use of Template Inheritance, ensures that extended data formats remain compatible with any applications and utilities that are designed to work with an original data schema. Furthermore, the use of a generic meta-language that is both powerful and easy to use, provides the ability to implement descriptions and definitions for purposes beyond printer description or characterization language.

SUMMARY OF THE INVENTION

Generally described, a method is provided for use in a computer system to describe arbitrary data. In accordance with the present invention, the method provides a meta-language referred herein as "Generic Object Oriented Description of Structured Data" (GDL) and a Parser. GDL allows a user to express actual data and to create Templates, which are used to define the semantics for each data element as well as, to define how each data element fits into a larger data framework. Templates are implemented in a source file that defines one or more subject data in the form of Attributes and Constructs. The Parser implements the meta-language interpreting the contents of the GDL file and validating the syntax of entries based on the definitions provided within the Templates.

GDL introduces some primary concepts, which include, the generic extension of prior subject specific definitions, the use of templates and the concept of Inheritance. GDL is applicable and useful for defining any type of computer peripheral device. Templates provide context for the data that is associated with a described device as well as, a general organization of the related data. Inheritance defines the relationship between multiple templates while also allowing compact definitions and the creation of variants of a base framework. Inheritance also provides a means for third parties to extend and modify device definitions while still complying with the standard system templates that were initially defined. The structured method of GDL to create a schema for device definitions also provides a means to facilitate semantic and definitional information verification within the text-based file.

A GDL Parser is the component that aides in the realization of the benefits associated with the GDL paradigm. The Parser provides syntax parsing, data store Tree building, template filtering, semantics validation and serialization/de-serialization support. Syntax parsing consists of exploring and discovering the structure and contents of the GDL source file. Every entry in the GDL file is ultimately represented by a unique node in a data or Template Tree. Parser Filters convert raw value strings to other data types and data structures that can be utilized by clients to present the different views of the parse Tree. The Parser Filter also allows the client to determine the template attributes that have been defined for each GDL entry thus verifying the semantics. As stated earlier, the result of parsing a GDL source file is a complex Tree. This Tree is serialized, meaning that an internal representation of the information obtained from the parsing is stored in such a way that it can be retrieved (de-serialized) without a need for re-parsing the source file. The internal representation of nodes in the Tree is dynamically configurable, that is it can be modified, deleted or added as needed.

Additional advantages and novel features will be set forth in the description which follows, and in part may become apparent to those skilled in the art upon examination of the following, or may be learned by practice of the invention.

BRIEF DESCRIPTION OF THE SEVERAL VIEWS OF THE DRAWING

The present invention is described in detail below with references to the attached drawing figures, wherein:

FIG. 4 is a simplified illustrative diagram of a Template Inheritance Tree created by the GDL Parser of the present invention; and FIG. 5 is a block diagram illustrating a high level modular interface between the GDL Parser, Filters, and device drivers in the present invention.

DETAILED DESCRIPTION OF THE INVENTION

Figure 1:
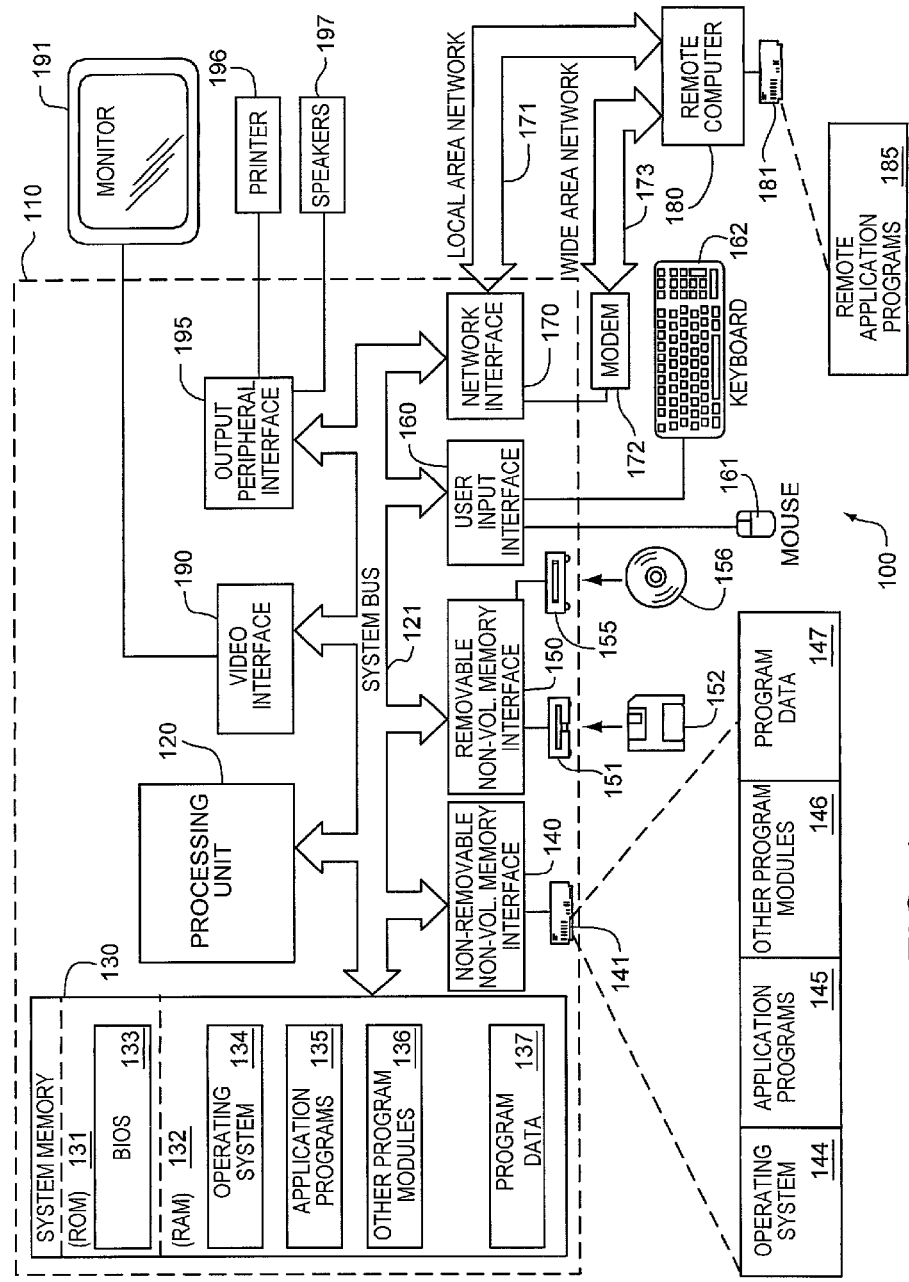
FIG. 1 is a block diagram of a computing system environment suitable for use in implementing the present invention.
Figure 2:
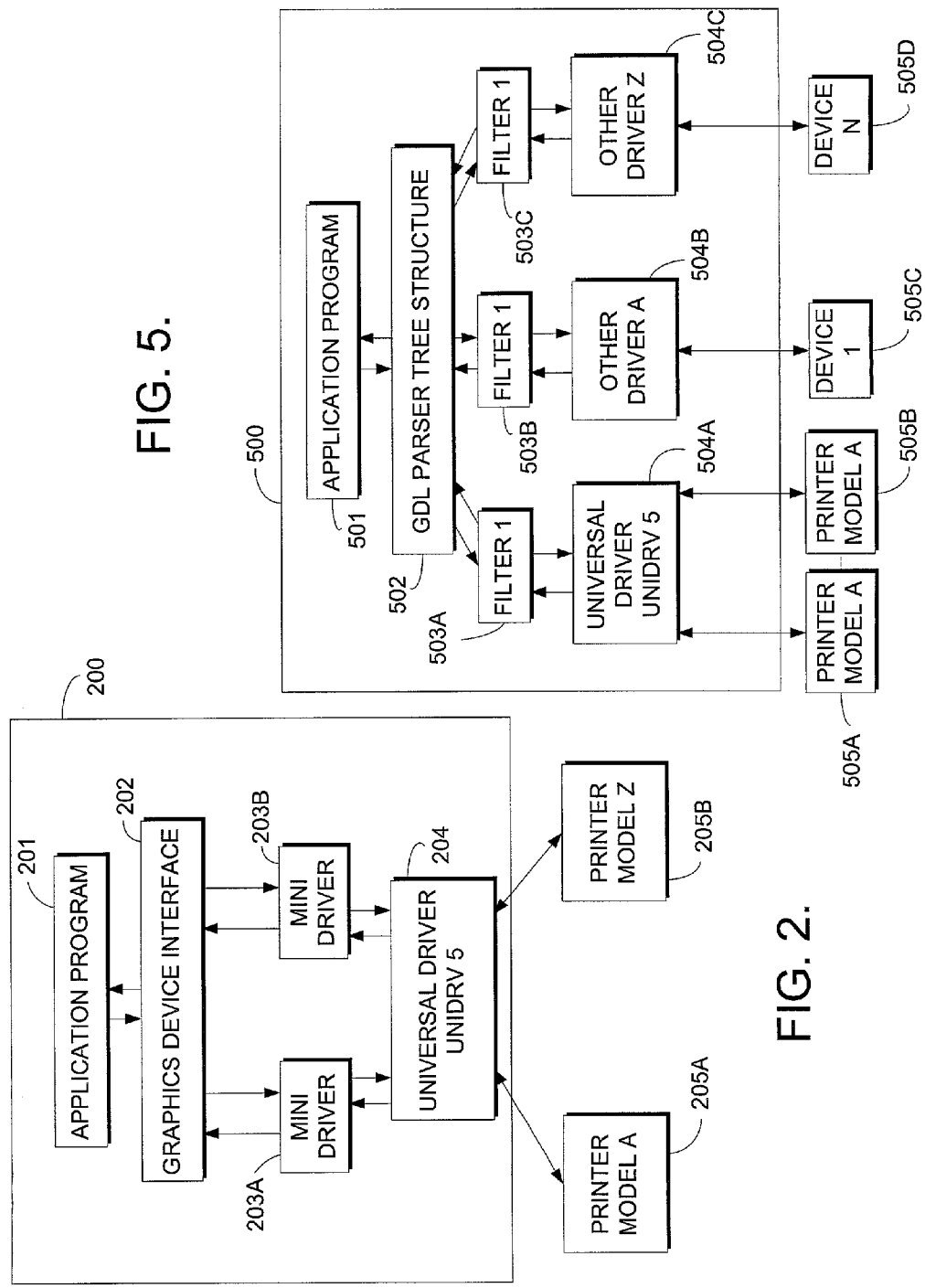
FIG. 2 is a simplified block diagram illustrating high level modular interface between the universal printer driver and the OEM customization modules as they existed prior to the present invention.

The present invention provides a method and language for organizing, defining and obtaining information associated with various subjects utilizing a computer system. By way of example, and not limitation, subject data includes computer devices, abstract ideas, music and other such information or concepts. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The method and system of the present invention allow the definition, scripting and parsing of information related to a subject. Although the method and system are described as being implemented in a "WINDOWS" graphical operating system by "MICROSOFT CORPORATION", one skilled in the art would recognize that the method and system can be used in any system supporting multiple peripheral devices that are manufactured or implemented by third parties. In addition, while the methods of this invention are described as being implemented with a certain syntax—GDL, it should be noted that this is being done for illustrative purposes and the syntax provided herein are exemplary. The use of other meta-language syntax are within the scope of this invention.

In general, GDL data is a set of Attribute:Value entries. A set of entries refers to zero, one or more entries. Collections of such entries are called Constructs. Each of the entries that forms the body of a Construct is called a Construct Member. Each Attribute names a parameter and a value that is assigned to that Parameter. In GDL all Attribute names begin with an asterisk for example: *OdometerReading: 28195 would be an Attribute:value entry in a GDL. Constructs allow related entries to be grouped in logical data sets. For example if we have a set of data describing a car, we may organize it as follows:

```
*Vehicle: Dodge_Minivan
{
*Make: Dodge
*Model: Caravan
*Year: 1998
*OdometerReading: 28195
*LicensePlate: XQM 498
}
```

In this example, Vehicle is a Construct type that groups together some Attributes namely Model, Make, Year, OdometerReading and LicensePlate.

Figure 3:
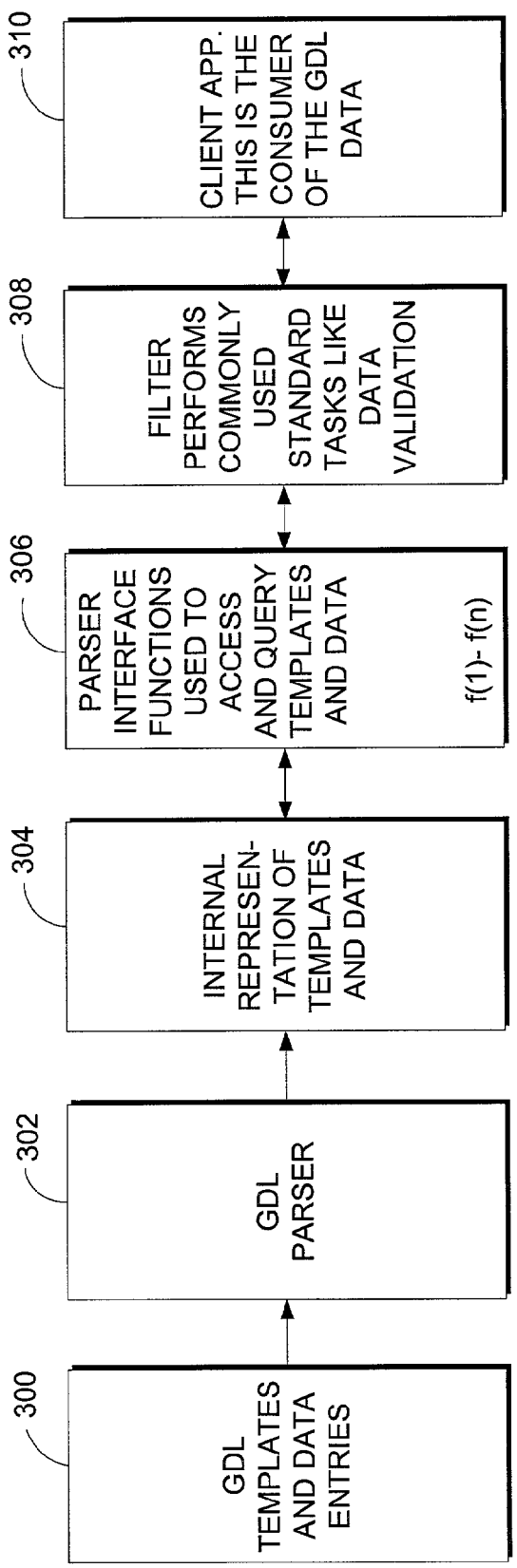
FIG. 3 is a block diagram illustrative of the components and data flow involved in the Parsing process of the present invention.

FIG. 3 illustrates an overview of an implementation of the present invention, with respect to the component steps 300–310 that are involved. In general, the practice of this invention initially requires creating a text file 300 that contains the GDL Templates and other data entries. A GDL Parser performs the process of reading the file and the various entries as well as providing a data Tree, methods to enumerate branches, Tree navigation, switch/case processing and data access. The parsing begins at step 302. The Parser then generates an internal representation ("Tree") at step 304, of the data that is obtained from the text file. A set of Parser interface functions f(1) through f(n) provide access to the internally represented templates and data at step 306. Filters that are specific to a client application or to other programs that are consumers of the GDL data perform validation, conflict resolution and other types of specific data manipulation or conversions that are beyond the scope of the Parser at step 308. Finally at step 310, the application and or program that will consume the data are able to obtain the information. The specific details of each of the aforementioned steps and procedure follows.

The GDL text file, must conform to the specifications of the GDL specifications. The file is comprised of Template and non-Template entries, both of which conform to valid GDL syntax. The non-Template entries are use to construct a value Tree which holds all of the Attributes and Constructs, and their associated values. The Template entries are use to create another Tree which is linked to the value Tree. A GDL file may be thought of as a sequence of entries. Each entry being a Keyword:Value pair, separated by a colon and terminated by a logical line break. The specification of GDL is best explained by specific reference and discussion of the features that are integral to the language. These features include the concepts of Templates, Template Inheritance and the GDL Parser. The Parser will be used to explain and specify the syntax of the language along with how the GDL data is made accessible to client programs and applications.

Templates provide context for the data. Templates are a purely data-driven way of specifying a set of semantic rules to which a GDL file shall conform. For example the *Name keyword defines the Name for some object, the issue is then whether Name refers to a person, planet, printer, feature or option. Further more, there is the issues of whether there are any restrictions on a well-formed Name. This and other similar issues are resolved by a Template. The *Template construct and the parser-recognized template member entries *Name, *Inherits, *Members, *Type, *Instances, *Virtual, *AllowNewMembers and *NewMemberOf allow the GDL Template writer to define a Tree of Templates which in turn are used by the Parser to structure, organize and associate specific Templates with each of the user-defined Attributes and Constructs. A *Template Construct defines the properties for one GDL entry i.e. either an Attribute or Construct. The members of a Construct are given their own separate Templates. The Template support provided by the GDL parser imposes a global scale of organization on the GDL's data. The association of a Template with each of the data entries in a GDL file is essential to effectively utilize Template inheritance. Every data Entry either exists at the Root level or as a member of a parent construct. If it resides at the Root level, the Members list defined by the ROOT template is searched for the first Template that qualifies to be associated with the Entry. If the data entry is a member of a construct, the Members list of the Template that is associated with the parent construct is used. The Members list and GDL file entries are searched starting with the most recently added element. When the Members list has been exhausted, if the Template containing the Members list has been derived, the search will continue with the direct Base Template's Members list until the Base-most Template's Members list has been searched. The search will terminate when a Template that qualifies to represent the data Entry has been found. As such, a subsequent use of an identical template name may cause a different schema to be associated to a particular variable than other variables defined in a different position within the GDL file. If no qualifying Template has been found when the end of the list is reached, the data Entry will be left without a Template association, these may be referred to as unidentified Entries The more local semantic contents are left to the Filters. Filters are used to specify and or define Template keywords and entries that describe Construct and Attribute properties.

For example, a filter could be used to define the *DataType of an Attribute or to describe whether a particular member of a Construct is required or optional. It should be noted that since the Template is itself written in GDL syntax, all of the foregoing regarding self-extensibility of GDL entries applies to Template entries. In order to better define the relationships among Templates, the concept of object oriented Inheritance is implemented in GDL.

Template Inheritance creates compact definitions, addresses the need to express variants of a basic type in elegant fashion and make manifest, the structure and organization of the data. Even more importantly, the concept of Inheritance allows an end user to extend and build upon the base framework without needing to alter or redefine the base framework. Inheritance lends itself perfectly to an environment where the Operating System supplies a standard template file which defines all of the Constructs and Attributes currently in use today, yet allows an OEM to extend the standard templates via Inheritance to define new members or to create specialized cases. Inheritance of templates also forces the template writer to understand the structure of the data he is attempting to describe. For example all Feature Constructs share some properties in common. These properties are most appropriately defined by a base Feature template. Specific Features can then be derived from the base template which add feature specific properties or restrictions. Deriving each template from the Base Feature template assures all derived templates inherit all of the essential properties common to all Features. By always asking 'what properties should a particular template define and which should be left to the derived templates', the designer focuses on the organization and structure of, and the relationships between the data.

The concept of Templates is best understood by discussing how Templates work. FIG. 4 depicts a simplified diagram of Templates and a Template Inheritance Tree. A discussion on some of the specific keywords that are used in this representation can be found in the section on the Parser later in this document. As shown, straight lines in the diagram 450,451 and 459 indicate a connection of a base Template to a derived Template. The curved lines 452–458 indicate a connection from a Construct Template to its members. The following is an example of the contents of a source file that describes a printer and some the printer features. The relationship of some of templates are also pictorially provided in FIG. 4:

```
*Template: NAME
{
  *Name: "*Name"
  *Type: ATTRIBUTE
  *ValueType: QUOTEDSTRING
}
*Template: OPTIONID
{
  *Name: "*OptionID"
  *Type: ATTRIBUTE
  *ValueType: INTEGER
}
*Template: OPTION
{
  *Name: "*Option"
  *Type: CONSTRUCT
  *Virtual: TRUE
  *Members: ( NAME, OPTIONID , OPTIONSELECTCOMMAND,
     RCICONID, RCHELPID, RCNAMEID)
}
*Template: GENERIC_OPTION
```

-continued

```
{
  *Inherits: OPTION
  *Instances: <ANY>
}
*Template: PAPERSIZE_NAME
{
  *Inherits: NAME
  *Name: "*Name"
  *MaxCharLength: 24
}
*Template: INPUTBIN_NAME
{
  *Inherits: NAME
  *Name: "*Name"
  *MaxCharLength: 16
}
*Template: PAPER_OPTION
{
  *Inherits: OPTION
  *Members: (CURSORORIGIN, PAPERSIZE_NAME)
  *Instances: <ANY>
  *Virtual: TRUE
}
*Template: STANDARD_PAPER_OPTION
{
  *Inherits: PAPER_OPTION
  *Members: (PRINTABLEAREA, PRINTABLEORIGIN,)
  *Instances: <ANY>
  *Virtual: TRUE
}
*Template: LETTER_PAPER_OPTION
{
  *Inherits: STANDARD_PAPER_OPTION
  *Instances: LETTER
  *Virtual: FALSE
  *AllowNewMembers: TRUE
  *RequiredInitializations: *% specific initializations for Letter Size
  {
    *Option,ID: 1
  }
}
*Template: LEGAL_PAPER_OPTION
{
  *Inherits: STANDARD_PAPER_OPTION
  *Instances: LEGAL
  *Virtual: FALSE
  *RequiredInitializations: *% specific initializations for Legal Size
  {
    *OptionID: 2
  }
}
*Template: MEDIATYPE_OPTION
{
  *Inherits: OPTION
  *%Members: NONE
  *Instances: <ANY>
  *Virtual: FALSE
}
*Template: FEEDMARGINS
{
  *Name: "*FeedMargins"
  *Inherits: POINTVALUE
}
*Template: INPUTBIN_OPTION
{
  *Inherits: OPTION
  *Members: (FEEDMARGINS, PAPERFEED, INPUTBIN_NAME)
  * Virtual: TRUE
}
```

With reference to FIG. 4, the first Template 400 has the name "Option", it has 2 members namely NAME and OPTIONID, and it is a Construct type Template. The members of Option 400 are Attributes which themselves can be described by a Template 401,402. In this example therefore, NAME 401 and OPTIONID 402 are Templates of the Attribute Type, which further define the original Template OPTION 400. INPUTBIN_OPTION 410 and PAPER_OPTION 420, are Templates that are derived form OPTION 400 and thus inherit the Attributes of OPTION 400. Furthermore, the Template INPUTBIN_OPTION 410 also has Attributes of its own as defined by its members FEEDMARGINS AND INPUTBIN_NAME. These members are also described by Templates 411, 412.

Member Templates such as INPUTBIN_NAME 412 can also be derived from a previous Template such as NAME 401, in other words, the INPUTBIN_NAME 412 would contain everything that NAME 401 contains. The same interpretation would be applicable to Member Template PAPERSIZE_NAME 422. This nesting can be carried to varying levels, for instance, INPUTBIN_OPTION 410 and PAPER_OPTION 420 are derived from OPTION 400, each of which can also have Attributes of their own namely FEEDMARGINS 411 and CURSORORIGIN 421. A template may also be derived from a previously derived template, for example, STANDARD_PAPER_OPTION 430 is derived from PAPER_OPTION 420, which was derived from OPTION 400. In this case, STANDARD_PAPER_OPTION 430, inherits not only the Attributes of PAPER_OPTION 420 namely, CURSORORIGIN 421 and PAPERSIZE_NAME 422, but also the Attributes of OPTION 400 namely NAME 401 and OPTIONID 402.

An interpretation of the representation in FIG. 4 relating to PrintableArea 431 could be stated as follows. PrintableArea 431 is an attribute of a Standard_Paper_Option 430, which is a variation of available Paper_Options 420, which in turn is a variation of available Options 400. This representation that has been thus far discussed, is an embodiment of the outcome from a Parser that is interpreting a GDL text file.

A Parser associates every data (Non-Template) entry in a GDL file with a Template. If the entry is a Construct, the Template specifies all of the Members that may appear within that Construct. This association is applied recursively so that every entry can be templatized. An examination of Template keywords and association will illustrate how this works.

*Template: SYMBOL—This introduces a Template construct. The symbol value is the name of the Template. Templates may appear only at the ROOT level. A Template cannot be redefined. This encourages the use of Inheritance as the mechanism to modify and extend descriptions. The remaining keywords that are described below occur within the body of the Template construct. In addition, the GDL template writer may insert into the Template body, other keywords of his own creation that can be accessed by his own Filter.

*Name: QUOTED STRING—This entry defines the Keyword that can be associated with the template. The Quoted String value need have no relationship to the SYMBOL value of the *Template Construct. Many different templates may have the same *Name, this issue is discussed in a later section in terms of how the Parser finds the right Template to associate with each data entry. The *Name entry may be redefined in any derived Template however, doing so will exclude the derived Template and its progeny from the base Inheritance Tree. In other words redefining *Name in a derived Template will cause the base Template not to report the derived Template as being derived from the base Template.

*Inherits: SYMBOL—This causes the current template to inherit the inheritable properties of the Base Template named by SYMBOL. Currently only Single Inheritance is supported. The Base Template must have been previously defined. The Base Template will register the derived Template as part of its Inheritance Tree unless *Name is redefined.

*Members: List of SYMBOLS (inherited additively)—specifies a list of candidate Templates that will be considered for association with any data entry which belongs to a Construct which is already associated with this Template. The rightmost template named in the list is considered first. The template entry *NewMemberOf: can be used to add members to this list after the template has been defined. Such templates will be searched before those explicitly named in the *Members list.

*Type: ENUMERATOR (inherited, no redefinition allowed)—Specifies the type of data entry or object being described by this template. The parser recognizes the enumerator values {CONSTRUCT, ATTRIBUTE, VALUE } however any enumeration value may be specified. Only Templates with *Type=CONSTRUCT or ATTRIBUTE may appear in a *Members list. This is a required Keyword for all Non-derived Templates. *Templates of Type=CONSTRUCT must eventually contain the following entries: *Name, *Members, and *Instances. *Templates of Type=ATTRIBUTE need only define *Name. The parser imposes no rules on other template Types. The other types are intended for use by Filters.

*Instances: List of SYMBOLs (not inherited)—specifies a list of InstanceName SYMBOLs—This entry specifies which instances of the given construct are matched by this template. The special name <ANY> matches all instance names. In order that a template match a data construct entry, the *Instances attribute of every inherited template must also match.

*Virtual: BOOL (default is FALSE, not inherited)—If the BOOL value of this entry is TRUE, the parser will not require that the Template define *Name, *Instances, or *Members. This allows this Template to define a set of common properties that can be applied to many different Keywords and Instances through Inheritance. The derived Templates can define *Name, *Instance and *Members. Templates declared *Virtual will not be associated with any data entry. Note: a Virtual Template may choose to define any or all of these keywords. Any Template that the designer intends to use to specify common properties but is not complete enough to fully define a data entry may be designated Virtual.

*NewMemberOf: List of SYMBOLs (not inherited)—specifies a list of Template Names—this adds the current template to the Members list of the construct templates named within. The named templates must be declared Type=CONSTRUCT and have *AllowNewMembers: TRUE.

*AllowNewMembers: BOOL (Default value: FALSE, not inherited)—Specifies whether or not this template shall allow subsequent additions to its *Members: list through the use of *NewMemberOf entry.

To better illustrate the use of the keywords described above, the following is a sample GDL file entry where the Attribute *Cost: may be described by a Template:

```
*Template: COST
{
  *Type: ATTRIBUTE
  *Name: "*Cost"
  *ValueType: CURRENCY
}
```

-continued

This Template may be referenced by another Template, for example:
```
*Template: SERVICE_RECORD
{
  *Name: "*Service"
  *Type: CONSTRUCT
  *Members: (COST, DATE, DETAILS)
  *Instances: (OilChange, Repair, Overhaul, Bodywork)
}
```

The SERVICE_RECORD template defines a Construct that may contain members that fit the definition provided by the Templates COST, DATE or DETAILS. In turn the SERVICE_RECORD Template may be referenced in a MAINTENANCE_HISTORY Template and so on.

A Parser associates with the Root context a Template named ROOT. A Template named ROOT must always be defined in a GDL file. All data entries at the Root level should be associated with a Template named in the ROOT Template's *Members list. The same process is applied for Constructs. A Template writer should ensure there is a Template associated with each data entry that appears in each data Construct and that each such Template is named in the *Members list of the Template associated with the data Construct. In addition to the keywords and Templates that were just discussed, GDL also includes a syntax which allows the appropriate representation and interpretation of entries that are made in a text-based file.

In order to more fully explain what constitutes a valid GDL entry, the concept of "Parsing Contexts" must first be explained. It should be noted that the information and explanations provided on the Parser are exemplary and are used to facilitate an understanding of the concept of the present invention's inheritance based schema. Parsing Contexts are stages in the parsing process that determine how certain line entries in the text-based file should be treated or interpreted. In other words, a particular character may or may not have meaning depending upon the Context that is current at the time such character is encountered. As previously stated, a GDL Parser is a state-machine, the states of the Parsing engine correspond to Parsing Contexts. In each Context, all input characters are classified into one of 3 types:

Neutral characters—characters that do not cause a context change;
Illegal Characters—Characters that are not allowed in this context;
Active Characters—Characters that induce a context change.

As indicated, some characters are meaningful only within certain Contexts. There are also several characters that are meaningful in all Contexts but are interpreted differently depending on the particular Context. For Instance, most contexts recognize Logical Whitespace, this consists of the space and tab characters, the Ctrl-Z character, comments and a continuation linebreak. A comment begins with the two characters "*%" and ends when a linebreak ('\n' or '\r') character is encountered. A Whitespace or Linebreak character must precede the "*%". Any characters may appear within a comment. A continuation linebreak is a linebreak character combination that is escaped by being immediately followed by the plus '+' character, indicating that the information continues on the following line. Conversely, outside of a Value Context, Logical Whitespace typically terminates any keyword or token in the process of being parsed, but is otherwise ignored. Within a Value Context, any amount of contiguous Logical Whitespace results in one space character appearing in the Value String that is returned by the native GDL Parser interface. A Logical linebreak typically terminates the entry. Other contexts treat Logical linebreaks as Logical Whitespace. Logical linebreaks consists of the characters '\n' and '\r' and the combinations "\n\r" and "\r\n". In addition, the curly brace characters '{' and '}' also act as entry terminators in addition to their role as Construct delimiters. Continuation linebreaks are not considered Logical linebreaks.

Construct delimiters change the node that is designated as the Current Parent. Current Parent is a representation in a Tree. A Tree is created by the Parser as a representation of certain entries in the GDL text-based file. Associated with this Tree, is a well defined starting point, which is referred to as the Root. The Tree is comprised of individual nodes which are all linked together. Every node except the Root has a parent node. Each node may have zero, one, or more child nodes. The parent node corresponds to a Construct entry in the GDL source file. Its child nodes correspond to the members of that Construct entry. As each entry in the GDL source file is parsed, a node is added to the Parse Tree. New nodes are added as child nodes of the node that the parser designates as the Current Parent. Initially Current Parent is set to the root. The close curly brace character '}' makes the parent of the Current Parent the new Current Parent. The open curly brace character '{' makes the most recently created child of the Current Parent the new Current Parent. A fatal syntax error will result if the GDL Parser attempts to move the Current Parent to the parent of the Root or if it attempts to force Current Parent to point to a non-existent child node. Nodes that are parents of other nodes correspond to Constructs, while nodes that are not parents correspond to Attributes.

A GDL entry immediately preceding the open curly brace character is called the Construct Entry. The keyword name given to the Construct Entry is called the Construct Type, while the symbol value is known as the Construct Instance. The symbol value token must be comprised of Alphanumeric and underscore characters.

Newentry Context, is the initial parsing context before any character is read from the GDL file. In this Context, an initial Keyword token is expected. Any amount of Logical Whitespace may appear before the Keyword and will be ignored. The Keyword may be prefaced by a double colon "::" or the token EXTERN_GLOBAL to indicate that the keyword is actually a member of the Root rather than the current Construct. If the token EXTERN_GLOBAL is used, it must be separated from the keyword by a colon. The Keyword token may be comprised of Alphanumeric characters, the asterisk, question-mark, and underscore characters. A Logical Linebreak appearing immediately after the Keyword defines an Attribute with no value. If a value is to be associated with this Keyword, the Keyword must be followed by a colon. A logical linebreak appearing immediately after this colon will also result in an Attribute with no value. The parsing of this colon causes a transition to the default value context.

Default value context is the initial context for parsing a value. It is also the only context where Logical linebreaks will terminate value parsing and complete the definition of the Attribute. From any Value Context, active characters will either cause the current context to be saved and a new context to be created, or cause the current context to terminate and either return to the previously saved context, or initiate a transition to a different context. When a current first context is saved, processing will resume with that first context when the new second context terminates. During the parsing of the Value String, any neutral characters encountered are transferred to the Value Buffer. The Value Buffer accumulates all the characters until value acquisition is terminated at which point the accumulated bytes are incorporated into the Node which represents the GDL entry. The Value Buffer is cleared at this time so that it is ready to accumulate characters for a new GDL entry. Certain actions will occur some specific characters are encountered in Default value context: The following table enumerates each of the active characters and describes the associated Context transition that is initiated.

Open Curly Brace terminate value acquisition, complete definition of attribute, point current parent to the attribute just created. Transition to Newentry Context.

Close Curly Brace terminate value acquisition, complete definition of attribute, point current parent to parent of current parent. Transition to Newentry Context.

Other Logical linebreaks terminate value acquisition, complete definition of attribute. Transition to Newentry Context.

Logical whitespace add one space character to Value Buffer. No state change.

Equals '=' if the equals character is immediately followed by a previously defined Value Macro Name, save current context, transition to DereferenceMacro context. Otherwise treat like a neutral character.

Open Parenthesis '(' add character to Value buffer, save current context, transition to Open Parenthesis context Open Square Bracket '[' add character to Value buffer, save current context, transition to Open Square Bracket context.

Percent '%' if keyword has been declared in a template to allow Command Parameters, add character to Value buffer, save current context, transition to Command Parameters context. Otherwise treat like a neutral character.

Double Quote '"' add character to Value buffer, save current context, transition to Quoted String context.

Close Parenthesis ')', Close Square Bracket ']' illegal in this context.

All other characters are neutral characters.

The DereferenceMacro context replaces a macro reference by the contents of the macro. The current input pointer points to the first character of the macro. Upon completion of the macro content, control returns to previously saved context.

Open Parenthesis context is similar to Default value context with the following differences in action:

Open Curly Brace add character to Value buffer, save current context, transition to Open Curly Brace context.

Other Logical linebreaks add one space character to Value Buffer. No state change.

Close Parenthesis add character to Value buffer, Return to previously saved context.

Close Curly Brace, Close Square Bracket illegal in this context.

Open Square Bracket context: similar to Open Parenthesis context with the following differences:

Close Square Bracket add character to Value buffer, Return to previously saved context.

Close Curly Brace, Close Parenthesis illegal in this context.

Open Curly Brace context: similar to Default value context with the following differences:

Close Curly Brace add character to Value buffer, Return to previously saved context. If previously saved context is Command Parameters context also terminate that context and Return to previously saved context.

Close Square Bracket, Close Parenthesis illegal in this context.

Command Parameters context: similar to Open Parenthesis context with the following differences:

Percent, Close Curly Brace, Close Parenthesis, Close Square Bracket illegal in this context.

Quoted String context causes all characters to be treated as neutral characters with the exception of the following characters and character combinations. Note that no string processing actually occurs, that task is left to a Parser Filter.

Double Quote '"' add character to Value buffer, Return to previously saved context.

Less than character '<' add character to Value buffer, save current context, transition to Hexstring context.

Percent, Percent "%%" add both characters to Value buffer, continue processing as if a neutral character was encountered.

Percent, Double Quote "%"" add both characters to Value buffer, continue processing as if a neutral character was encountered.

Percent, Less than character "%<" add both characters to Value buffer, continue processing as if a neutral character was encountered.

Hexstring context allows only recognized hexadecimal characters and logical whitespace. Hexadecimal characters should occur in pairs to prevent syntax errors. This context does not actually convert Hexadecimal string format into binary bytes, that task is left to a Parser Filter.

Greater than character '>' add character to Value buffer, Return to previously saved context.

Other Logical linebreaks add one space character to Value Buffer. No state change.

Logical whitespace add one space character to Value Buffer. No state change.

Equals '=' if the equals character is immediately followed by a previously defined Value Macro Name, save current context, transition to DereferenceMacro context. Otherwise illegal character.

Hexadecimal characters 0–9', 'a–f', 'A–F' treat as neutral characters.

All other characters—illegal in this context.

Arbitrary Value context can be entered from any Value Context except Quoted String context and Hexstring context. In Arbitrary Context, all character processing is suspended and all characters are copied directly to the Value Buffer. The Context is entered when a string having the following format is encountered: "<BeginValue:tag>". The Context terminates when the string with the following format is encountered: "<EndValue:tag>". In both formats, Tag is a user-defined symbol name that is chosen to be a token that does not occur within the Arbitrary Value. The Tag used for EndValue: must match the Tag used for BeginValue:. The Arbitrary Value context allows the Parser to handle values that would otherwise violate the GDL syntax. Such values may include verbatim source code in other languages like XML or Scripts or Binary files. The BeginValue: and EndValue: directives are not copied to the Value Buffer. No white space is permitted between any of the elements comprising this directive.

Also available within GDL are special Constructs. An otherwise normal GDL entry introduces a Construct when it is followed by the OpenConstruct delimiter: '{'. This GDL entry is called the Construct entry. All subsequent GDL entries become members of that construct until the Construct is closed by the matching CloseConstruct Delimiter '}'.

Constructs may be nested within other constructs. The keyword name given to the Construct entry is called the Construct Type, the value of the Construct entry must be of type Symbol Name. The Symbol Name is known as the Construct Instance Name or simply Instance Name. Since multiple instances of the same Construct Type can be defined, the Instance Name identifies each instance of this type. Constructs cannot be declared to be EXTERN_GLOBAL There are keywords that trigger special case processing by the Parser, as such, there is often a syntax restriction associated with these keywords. These Keywords and the associated processing related to them are as follows:

*Template: This keyword is reserved by the parser.

*Include: "name of included GDL file". The parser inserts the contents of the named GDL file immediately after this entry. The string enclosed in double quotes will be converted to a binary string and that string converted to Unicode using the default code page. The resulting string will be used as the argument to OpenFile. Any characters outside of the Quoted String context will be ignored. This keyword cannot be used as a Construct Entry. The preprocessing pass is performed before any macro resolution or the normal parsing of entries begins. However, if the #Include: directive is encountered during preprocessing, the referenced file is opened and preprocessing is performed on the included files before resuming with the remaining entries in the parent file. This allows preprocessor directives in the included file to affect preprocessing in the remainder of the parent file. It should be noted that for backward compatibility, the keyword *Include: is still recognized however, any preprocessor directives defined within the new file will not be executed until after all the directives in the parent file.

*Cmd:, *Command: the use of the GPD command parameter syntax is enabled for these keywords. This syntax is not allowed for other keywords.

*SwitchCaseEvaluationBehavior: C_PROGRAM_BEHAVIOR <or> GPD_PARSER_COMPATIBLE: this parser directive is evaluated at parse time to set the current evaluation mode for switch/case Constructs. The directive has effect on the portion of the GDL file from the point of definition until another directive is encountered. By default the behavior is set to GPD_PARSER_COMPATIBLE.

Other types of general rules apply to a GDL text file. For instance, Whitespace and comments should be used to add visual clarity to the structure of the GDL file, but they will be stripped out by the parser. The amount of whitespace present in a value is insignificant unless the whitespace is part of a Quoted String. If a comment does not begin at the start of the line, it should be preceded by at least one whitespace character. For clarity, the asterisk character should only be used as the first character of a keyword and the question_mark character '?'only as the last character. Additional characters may follow the Instance Name in a Construct Entry. However, only the Instance Name will be enumerated by the interface function EnumerateConstructInstances( ), and only the Instance Name should appear as an argument to the Switch/Case Constructs, or be supplied when specifying a Configuration. To assist client programs or applications in obtaining a configuration to supply to the Parser's interface functions, the GDL file defines an initial configuration that is self-consistent. That is one that does not require constraint resolution. The initial configuration may be defined by selecting the option for each Feature using the *DefaultOption keyword. If this keyword is omitted, it is an indication to the client program or application that the first option of each Feature is used to construct the initial configuration. If *DefaultOption is enclosed by switch/case constructs, there should be an explicit *Default: case that is self consistent otherwise the first option will be assumed as the default.

As discussed in other sections of this document, the process of parsing a GDL text-file results in the building of Trees. One Tree consist of nodes that represent the Attributes, while the other represents the related Values, both of which are obtained from the text file. FIG. 5 illustrates the modular interaction and role of the GDL Parser Tree 502, Filters 503, device drivers 504 and devices 505. The functionality of the GDL Parser may be extended by clients through the use of GDL Parser Filters and Templates. Once support for Templates exists, enhancements do not require any changes to the GDL Parser. The native GDL Parser interface provides access to the raw, unprocessed values of every attribute in the GDL file through the Tree structure 502. There are times where it may be desired to limit access to certain types of Attributes (i.e. pruning the Tree) or to provide additional semantic processing of the raw value data bytes. These functions are implemented via a Parser Filter 503. A Parser Filter is another client interface that implements GDL navigation and queries, and calls upon the native GDL Parser interface to access the GDL information. However, the Parser Filter processes the information received before returning the information to its client. As shown in FIG. 5, the filters 503 process the information retrieved from the Parser Tree 502 before returning information to the Driver 504. It should be noted that each client driver 504 may have a specific filter 503 with which it is associated. The filter 504 provides functions that are specifically related to the ultimate client, in this case the device 505. For example, a Filter may remove unwanted Attributes from the lists returned by a function EnumerateEntries( ), or convert some values into more easily used data such as, converting a value string "PAIR( 1024, 0×fc)" into two dwords: 0×400 and 0×fc. Although Parser filters can rely on hardcoded semantic information, it would mean that a Parser Filter would need to be rewritten to handle new keywords. This alternative can be avoided by using Templates, which offer a data driven alternative as discussed above. Semantics processing for new keywords and constructs can then be provided simply by adding new Template entries in the source file. In other words, for each of the devices 505, there could be a specific Template in the GDL text file that describes and defines the attributes and functions that are common to such devices and one or more specific Templates that describe and define special features that are specific to that device provided that such special features involve new keywords or constructs. When a new function is added by a manufacturer to say device 1 505C, the associated keyword and attributes related to that function would appear in the GDL source file and could be described by one or more additional templates.

The Parser builds two Trees to store the entries that it parses. The RealTree is a one to one representation of the entire contents of the GDL file after the Preprocessing phase. It holds Macro definitions, Templates, and a literal representation of the entries and constructs including all Switch/Case constructs. If an Attribute or Construct is defined twice, the Tree will contain a node for each definition. The Root nesting Level corresponds to the Root node of the Tree. Each Construct and Attribute is represented by a node, the children of a Construct node correspond to the Members of the corresponding Construct entry. Attributes have no children. The actual value of each Attribute is stored in this Tree. The IndexTree is a simplified Tree that represents the logical structure of the RealTree. The IndexTree is the Tree whose structure is exposed via the Data Interface. The IndexTree does not contain Macros, Templates, Switch/Case constructs, values of Attributes nor multiple definitions. The Index Tree does have a node corresponding to every unique Construct and Attribute node that is not in a suppressed category. The current location used by the Get Data interface corresponds to a Construct node in the IndexTree. Each IndexTree node representing an Attribute points to a linked list, whose members are the actual Attributes stored in the RealTree. The Get Data interface functions GetRecentValue( ) and GetAllValues( ) evaluate each Attribute in the linked list to determine whether or not the Attribute is applicable to the Configuration. A Configuration is the set of FeatureInstance: OptionInstance pairs which represent the settings for a device. For example (PaperSize:Letter, InputBin:Lower). Switch/Case constructs express the dependencies of Attributes or Constructs on the configuration. The Location of each Attribute in the RealTree is used to determine whether its Value is reported back to the caller. For example if an Attribute is on a branch that contains *Switch:PaperSize and *Case:Legal, its value will not be reported if the current Configuration is set to PaperSize:Letter. The construction of the IndexTree greatly simplifies the implementation and improves performance of the interface functions Alternative embodiments of the present invention will become apparent to those skilled in the art to which it pertains upon review of the specification, including the drawing figures. The various computer systems and components shown in FIGS. 1–5 and described in the specification are merely exemplary of those suitable for use in connection with the present invention. Accordingly, the scope of the present invention is defined by the appended claims rather that the foregoing description.

We claim:

1. A method for use in a computing system for permitting the third parties to add a construct type and type designation for organizing and describing information pertaining to one or more peripheral devices comprising:
   providing a source file, said source file including a plurality of entries characterizing each peripheral device, wherein said entries are an instantiation of an inheritance-based schema and confirm to a predefined metalanguage syntax;
   providing a schema for organization of the source file, said schema comprising one or more families of templates, each family of templates describing features of a corresponding peripheral device and including at least one base template, the base template being of a construct type and configured to include a derived set of templates and a member set of templates including a type designation, wherein said derived set of templates inherits characteristics of the base template, each derived template derived from the base template being of a construct type and including at least a name and at least one member template, each member template including a name and defining one or more properties of a set of entries; and
   associating one or more entries with an appropriate template of a family, thereby allowing such entries to be also associated with other ancestral templates in the same family.

2. A method as recited in claim 1 further comprising processing said entries guided by said templates to obtain information pertaining to said subjects.

3. A method as recited in claim 1 wherein properties of said entries are optionally defined by a schema.

4. A method as recited in claim 2 wherein said processing includes providing internal representations of templates and entries.

5. A method as recited in claim 2 wherein said processing includes serializing said associations, wherein said serializing allows the systematic traversing of said associations for entries without the need to re-read the source file.

6. A method as recited in claim 2 wherein said processing includes filtering said associations.

7. A method as recited in claim 6 wherein filtering includes validating semantics of said associations.

8. A method as recited in claim 6 wherein filtering includes converting value types in said associations.

9. A method as recited in claim 6 wherein filtering includes default initialization of values.

10. A computer readable medium having computer executable instructions for performing the method recited in claim 1.

11. A computer system having a processor, a memory and an operating environment, the computer system operable to execute the method recited in claim 1.

12. A method for use in a computing system for permitting the third parties to add a construct type and type designation for organizing and describing within a source file, information pertaining to one or more peripheral devices comprising:
   providing a schema for organization of the source file, said schema comprising one or more families of templates, each family of templates describing at least one peripheral device and including at least one base template, the base template configured to include a member set of templates and a derived set of templates, each member template from the member set of templates including a type designation, wherein said derived set of templates inherits characteristics of the base template, each derived template derived from the base template being of a construct type and including at least a name and at least one member template a type, each member template including a name and defining one or more properties of a set of entries.

13. A method as recited in claim 12 wherein said schema comprises:
   one or more templates that utilize other defined templates as a base framework; and
   said templates are nested to varying levels.

14. A method as recited in claim 12, wherein said templates inherit other templates and thus share a core set of common properties.

15. A method as recited in claim 12 wherein said templates are used to define the semantics for device data elements and to define how device data elements fit into a larger framework.

16. A computer readable medium having computer executable instructions for performing the method recited in claim 12.

17. A computer system having a processor, a memory and an operating environment, the computer system operable to execute the method recited in claim 12.

18. A method for use in a computing system for permitting the third parties to add a construct type and type designation for describing peripheral devices, the method comprising:
   providing a source file including template entries and non-template entries, wherein each template entry belongs to a family of template entries describing features of at least one corresponding peripheral device, each family of template entries including at least one base template, the base template being of construct type and configured to include a member set of templates and a derived set of templates, each member template from the member set of templates including a type designation, wherein said derived set of templates inherits characteristics of the base template, each derived template derived from the base template being of construct type including a name and at least one member template, each member template defining one or more properties of a set of entries;

and providing a parser for creating at least one tree, wherein each node of the created tree associates a non-template entry with a corresponding template entry, said parser associating a dynamically configurable representation with each of at least a portion of said template entries.

19. The method of claim 18, further comprising providing a parser for creating a real tree containing a representation of the source file and an index tree containing a representation of a logical structure of the real tree.

* * * * *